L. D. BOWMAN.
Combined Cotton Scraper and Chopper.
No. 226,703. Patented April 20, 1880.
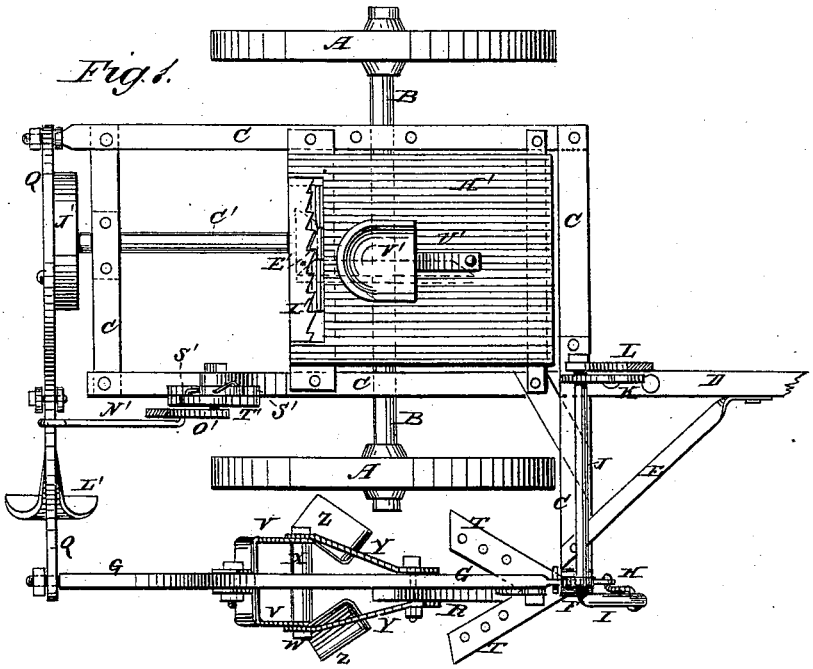
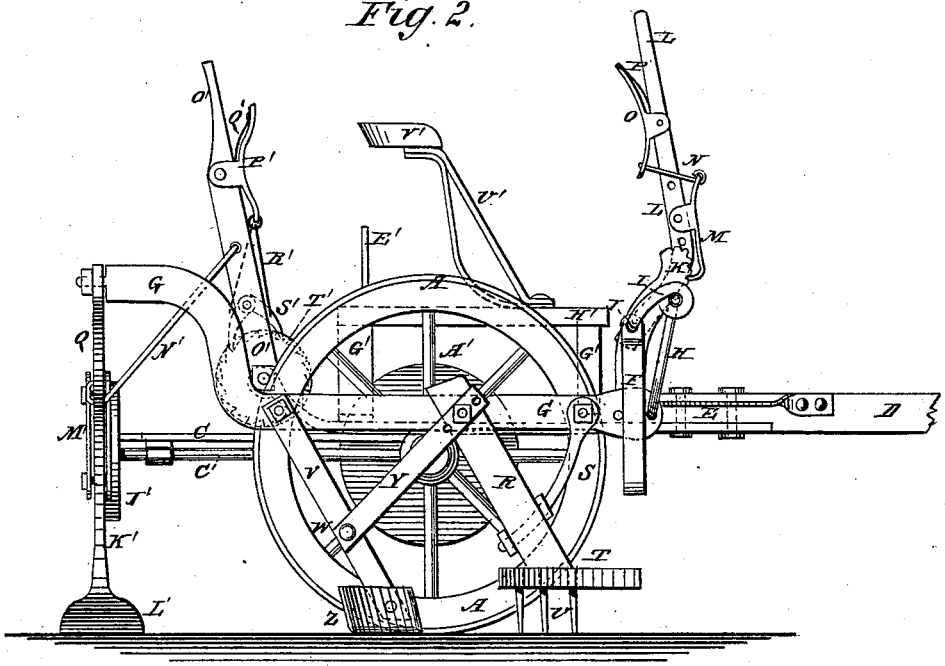
WITNESSES:
Francis McArdle
C. Sedgwick
INVENTOR:
L. D. Bowman
BY Munn & Co
ATTORNEYS.

2 Sheets—Sheet 2.
L. D. BOWMAN.
Combined Cotton Scraper and Chopper.
No. 226,703. Patented April 20, 1880.
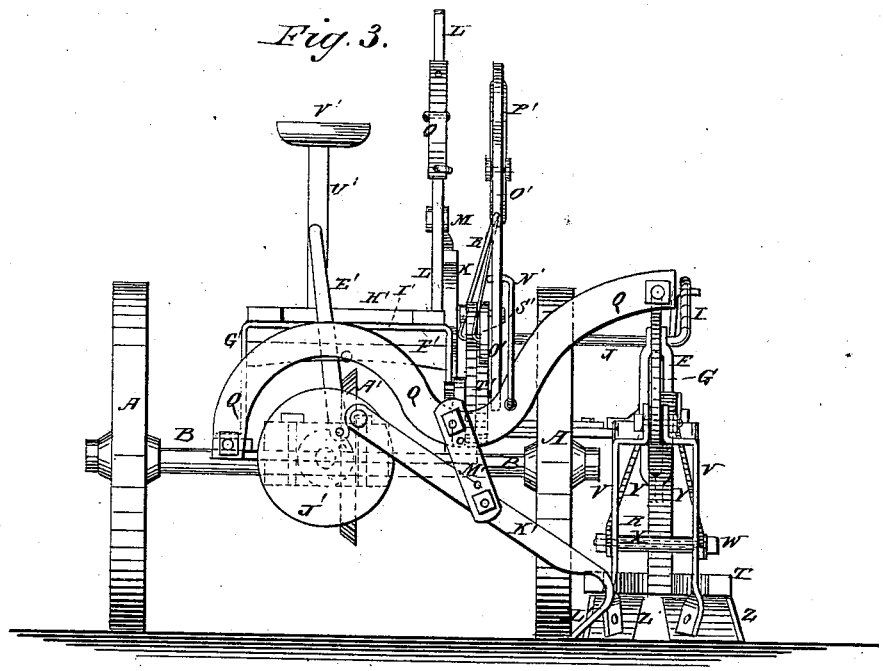
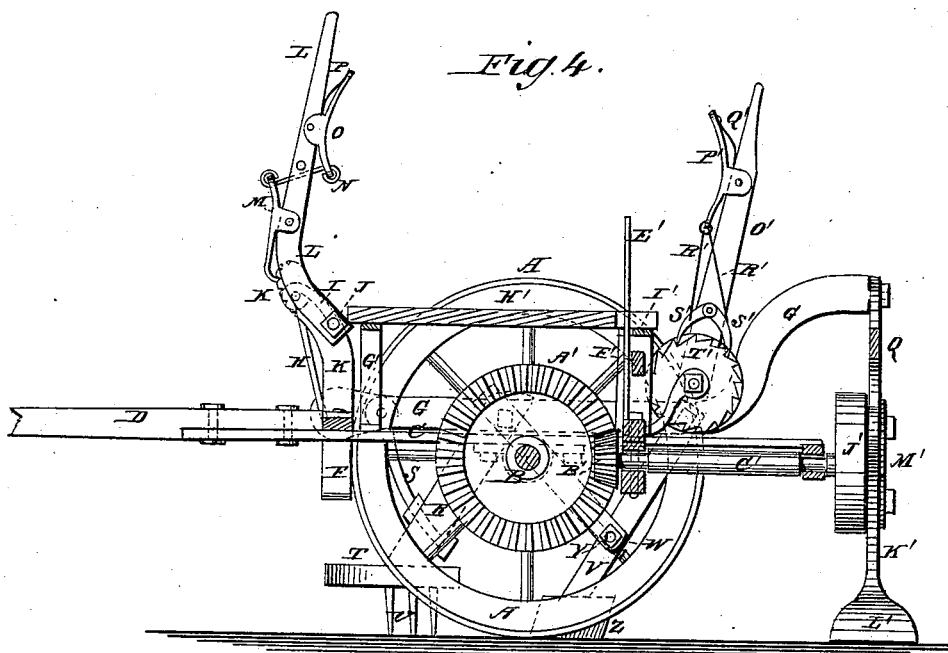
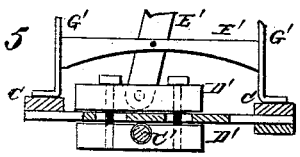
WITNESSES:
INVENTOR: L. D. Bowman
BY Munn & Co
ATTORNEYS.

UNITED STATES PATENT OFFICE.

LORENZO D. BOWMAN, OF BEEBE STATION, ARKANSAS.

COMBINED COTTON SCRAPER AND CHOPPER.

SPECIFICATION forming part of Letters Patent No. 226,703, dated April 20, 1880.

Application filed November 25, 1879

*To all whom it may concern:*

Be it known that I, LORENZO D. BOWMAN, of Beebe Station, in the county of White and State of Arkansas, have invented a new Improvement in Combined Cotton Scrapers and Choppers, of which the following is a specification.

Figure 1, Sheet 1, is a plan view of my improvement. Fig. 2, Sheet 1, is a side elevation. Fig. 3, Sheet 2, is a rear elevation. Fig. 4, Sheet 2, is a sectional side elevation. Fig. 5, Sheet 2, is a sectional elevation of the device for throwing the chopper into and out of gear.

Similar letters of reference indicate corresponding parts.

The object of this invention is to furnish combined cotton scrapers and choppers so constructed that the operating implements will be fully under the control of the driver, and may be adjusted to work at any desired depth in the ground.

A are the wheels, one of which is rigidly connected with and the other runs loosely upon the axle B. The axle B revolves in bearings attached to the frame C. The front cross-bar of the frame C projects at one side, preferably the off or right-hand side, so that its outer end may be beyond the wheel A.

To the forward end of the frame C is attached the tongue D, which is strengthened upon one or both sides by an inclined brace, E.

To the projecting end of the front cross-bar of the frame C is attached a vertical cross-head, F, which is slotted longitudinally and in line with the line of draft to receive the forward end of the side beam, G.

To the end of the side beam, G, at the forward side of the slotted cross-head F, is pivoted the lower end of a short connecting-rod, H, the upper end of which is pivoted to the end of a crank-arm, I, formed upon or attached to the outer end of the shaft J. The shaft J works in bearings in the upper end of the cross-head F and in the standard K, attached to the middle part of the front cross-bar of the frame C.

To the inner end of the shaft J is attached the lower end of a lever, L, so that the forward end of the beam G may be raised and lowered by operating the lever L. The lever L is held in any position into which it may be adjusted by the lever-pawl M pivoted to the lever L, and which engages with teeth formed upon the curved upper end of the standard K.

To the upper end of the lever-pawl M is pivoted the end of a short connecting-rod, N, the other end of which is pivoted to the lower end of a short lever, O.

The lever O is pivoted to the lever L, and its upper end is pressed outward, holding the pawl M in gear with the toothed standard K by a spring, P, attached to it, and which bears against the said lever L.

The rear part of the side beam, G, is curved upward and rearward, and its rear end is pivoted to the outer end of the rear beam, Q. The rear beam, Q, is curved downward, upward, and downward, and its inner end is pivoted to the rear corner of the frame C farthest from the side beam, G.

To the side beam, G, a little in front of its center, is attached the upper end of a standard, R, which is strengthened against the draft-strain by the brace S. The upper end of the brace S is bolted to the forward part of the beam G, and its lower end passes through the standard R, and is secured in place by two nuts screwed upon it, one upon each side of the standard R, so that the pitch of the said standard will be adjusted by adjusting the said nuts.

To the lower end of the standard R is attached a V-shaped frame, T, to the arms of which are attached harrow-teeth U, the forward or angular part of the frame T being left without teeth, to form a space for the row of plants to pass through, so that the soil will be loosened upon both sides of the row of plants by the harrow-teeth U.

To the opposite sides of the rear end of the horizontal part of the side beam, G, are bolted the upper ends of two standards, V, which are bent outward and then downward to bring them to the proper distance apart. The standards V are parallel with each other, and are held in proper relative positions by a long bolt, W, which passes through their lower parts, and the tubular washer X, placed upon the said bolt W between the said standards V. The draft-strain upon the standards V is sustained by the braces Y, the lower ends of which are secured by the bolt W. The upper ends of the braces Y are secured by the bolt that fastens the upper end of the harrow-standard R to the side beam, G. Several holes are formed in the upper ends of the braces Y to receive the fastening-bolt, so that the said braces may be adjusted to adjust the pitch of the standards V. The lower ends of the standards V are twisted inward, or are beveled to bring them into proper position to receive the scrapers Z.

The forward and lower edges of the scrapers Z are bent forward, so that they may readily cut and scrape off the weeds and soil.

To the middle part of the axle B is attached a large bevel-gear wheel, A′, into the teeth of which mesh the teeth of the small bevel-gear wheel, B′, attached to the forward end of the shaft C′. The forward part of the shaft C′ works in bearings D′, that slide upon a cross-bar of the frame C. The sliding bearings D′ are moved to throw the gear-wheels A′ B′ into and out of gear by means of a lever, E′, the lower end of which is pivoted to the bearings D′. The lever E′ is pivoted to a cross-bar, F′, attached to the posts G′, that support the platform H′ above the gear-wheel A′. The lever E′ passes up through a slot in the rear part of the platform H′, and is held in any position into which it may be adjusted by engaging with the teeth of the cross-bar I′.

The rear part of the shaft C′ revolves in bearings attached to the rear cross-bar of the frame C. To the rear end of the shaft C′ is attached a crank or crank-wheel, J′, to the crank-pin of which is pivoted the inner end of the shank or handle K′ of the hoe L′. The shank or handle K′ is pivoted to and between the lower ends of two bars, M′, the upper ends of which are pivoted to the opposite sides of the downward-bent middle part of the rear beam, Q. Several holes are formed in the bars M′ to receive the pivoting-bolts, so that the hoe may be adjusted to work deeper or shallower, as may be desired.

The curvatures of the rear beam, Q, and of the rear end of the side beam, G, provide spaces for the hoe K′ L′ to vibrate in, so that the hoe may work unobstructed. With this construction the movements of the hoe K′ L′, when at work, will be the same as in hand-chopping.

To the rear beam, Q, is pivoted the rear end of a hook-rod, N′, the hook of which is hooked into a hole formed in the lever O′, or into an eyebolt or staple attached to the said lever. The lower end of the lever O′ is pivoted to a support attached to the frame C.

To the upper part of the lever O′ is pivoted a short hand-lever, P′, the upper end of which is held out by a spring, Q′.

To the lower end of the short lever P′ are pivoted the upper ends of two connecting-rods, R′, the lower ends of which are pivoted to two pawls, S′, pivoted to the lower part of the said lever O′. The pawls S′ engage with the teeth of the double ratchet-wheel, T′, attached to the support that carries the lever O′, or to the frame C. The pawls S′ are placed in reversed positions, so as to hold the lever O′ securely against movement in either direction. With this construction, by adjusting the lever O′ the hoe K′ L′ may be adjusted to work at any desired depth in the ground, and may be supported above the ground, as may be required.

To the platform H′ is attached the lower end of a standard, U′, to the upper end of which is attached the driver's seat V′, so that the driver from his seat V′ can reach and operate either of the three levers L E′ O′, and thus fully control the operations of the various parts of the machine.

Having thus described my invention, what I claim as new, and desire to secure by Letters Patent, is—

The combination, with the carriage-frame, of the curved side and rear beams, having their ends pivoted together, and carrying respectively the side scrapers and rear chopper, and each connected with an operating hand-lever, as and for the purpose specified.

LORENZO DOW BOWMAN.

Witnesses:
J. H. SAPPINGTON,
S. S. WANN.